Oct. 7, 1958  S. S. SUTHERLAND  2,855,059
SELF-PROPELLED ENDLESS TREAD SNOW TRACTOR
Filed July 13, 1956  2 Sheets-Sheet 1
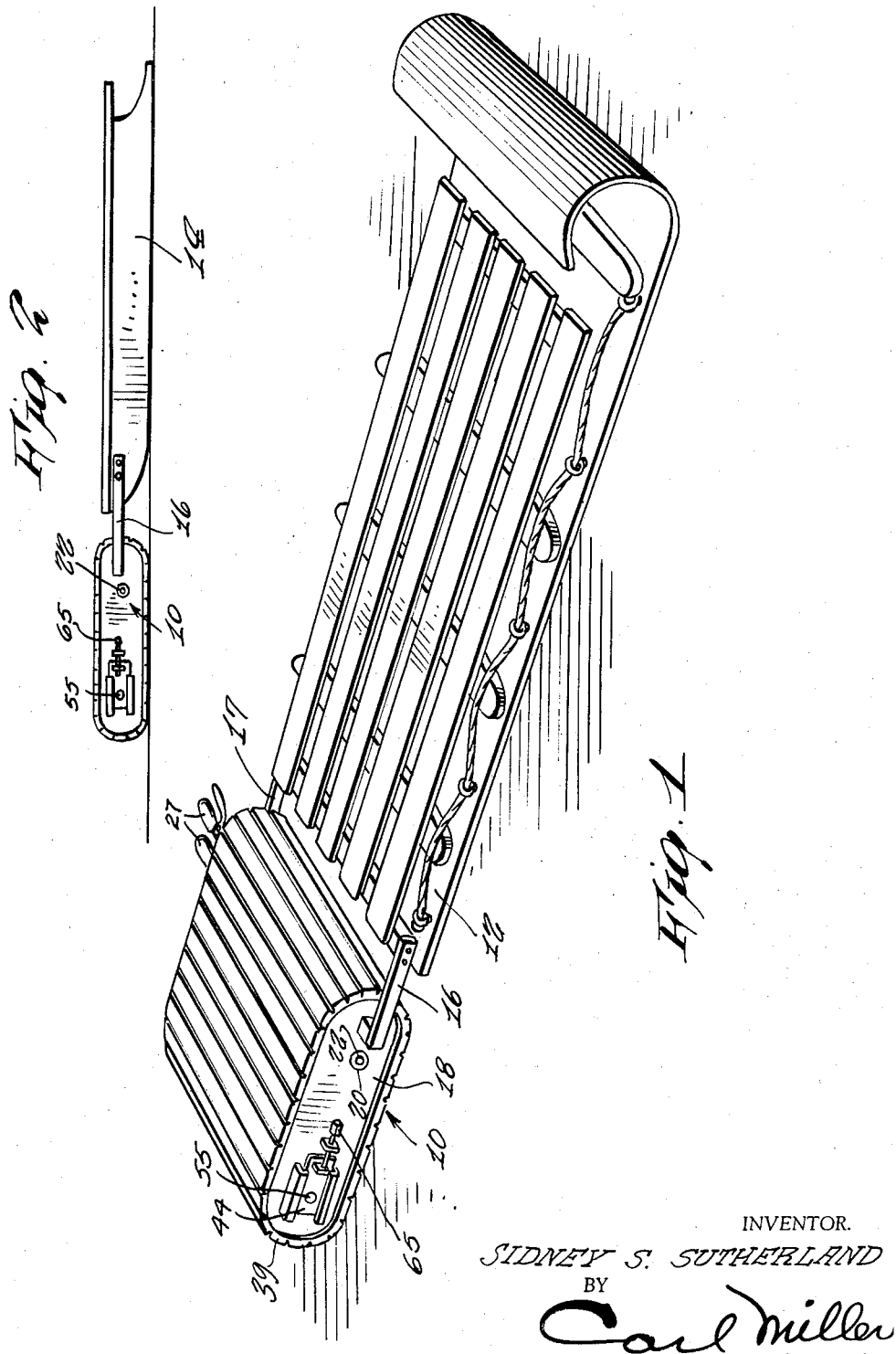
INVENTOR.
SIDNEY S. SUTHERLAND
BY
Carl Miller
ATTORNEY Oct. 7, 1958 S. S. SUTHERLAND 2,855,059
SELF-PROPELLED ENDLESS TREAD SNOW TRACTOR
Filed July 13, 1956 2 Sheets-Sheet 2

INVENTOR.
SIDNEY S. SUTHERLAND
BY
Carl Miller
ATTORNEY

United States Patent Office 2,855,059
Patented Oct. 7, 1958

2,855,059

SELF-PROPELLED ENDLESS TREAD SNOW TRACTOR

Sidney S. Sutherland, Big Bear Lake, Calif.

Application July 13, 1956, Serial No. 597,733

2 Claims. (Cl. 180—9.1)

This invention relates to self-propelled snow tractors and, more particularly, to snow tractors adapted to pull or push toboggan sleds, bobsleds and the like.

Various types of pushing and pulling devices have been proposed for use in hauling sleds and other snow equipment up and down hills and slopes for the purpose of eliminating the tedious and difficult work ordinarily attached thereto. Certain of these devices, however, have been cumbersome, difficult to operate, and expensive, whereby their use has been discouraged. An object of this invention, therefore, is to provide a snow tractor for hauling sleds and the like that is simple in construction, efficient in operation, and which will overcome the aforementioned difficulties.

Another object of this invention is to provide a self-propelled snow tractor having a large ground engaging driving surface tread that is adapted to be driven by means of a simple drive mechanism carried thereby.

A still further object of this invention, is to provide a simple and compact driving mechanism for self-propelled driving tractors that has a minimum number of parts, adjustment mechanism for compensating for the wear of certain drive parts, and which is readily disassembled for maintenance and repair.

All of the foregoing and still further objects and advantages of this invention will become apparent from a study of the following specification, taken in connection with the accompanying drawing, wherein:

Figure 1 is a perspective view of a device made in accordance with this invention in operative association with the rear end of a toboggan sled;

Figure 2 is a side view showing a device made in accordance with this invention in operative association with the front end of a bobsled;

Figures 3, 4:
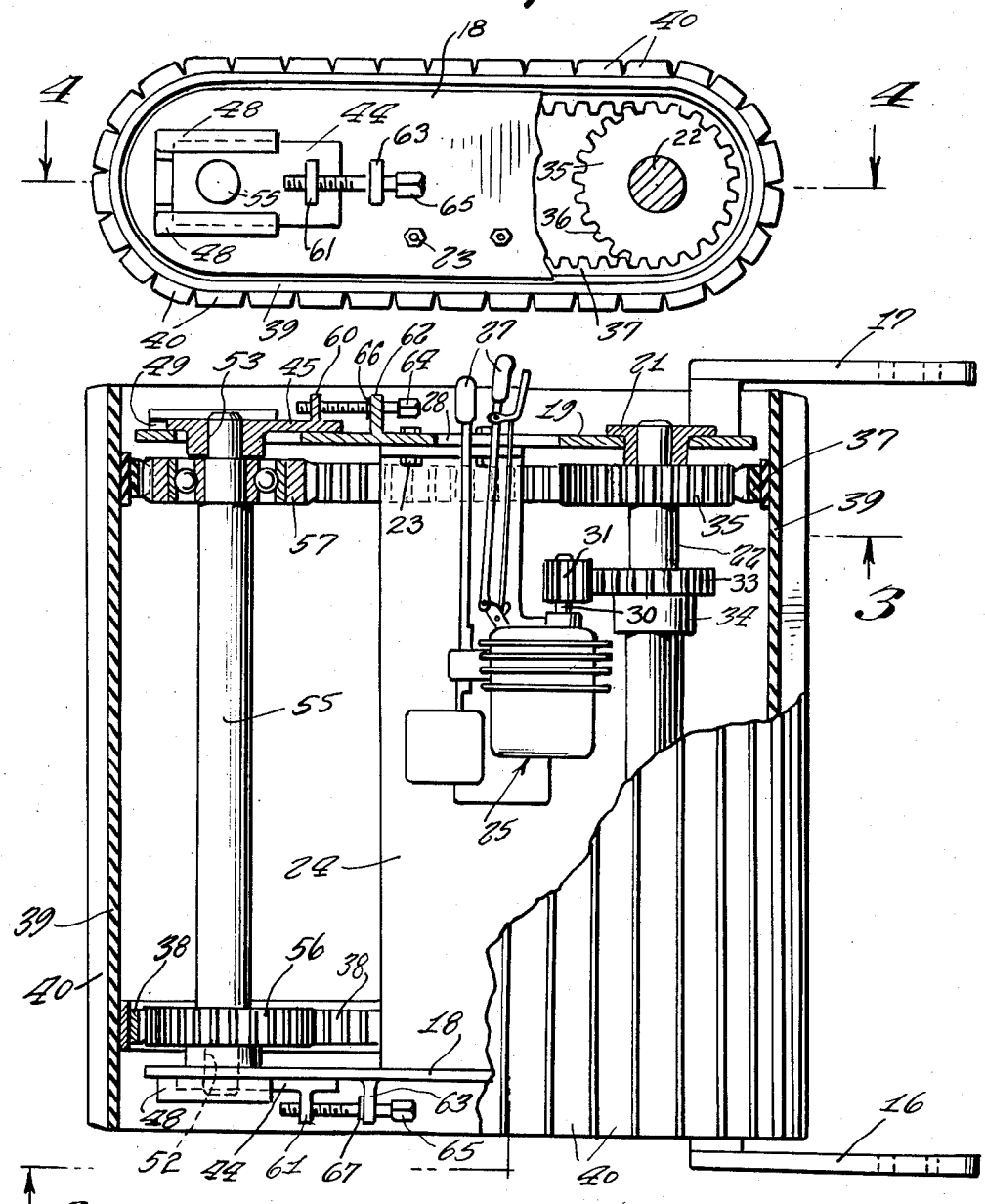
Figure 3 is a cross-sectional view taken along line 3—3 of Figure 4.
Figure 4 is a cross-sectional view taken along line 4—4 of Figure 3 showing the interior construction of the snow tractor shown in Figures 1 and 2.

Referring now to Figure 1 of the drawing, a snow traction vehicle 10 made in accordance with this invention is shown in operative association behind a toboggan sled 12 and arranged to push the toboggan sled in a forward direction. In Figure 2, the same traction vehicle 10 is shown in front of a bobsled 14 and arranged to pull the sled in a forward direction. In either case, the tractor 10 is provided with a pair of outwardly extending arms 16, 17, that are adapted to be fixed to an appropriate part of the associated sled. These arms are secured to the side frames 18, 19, of the sled which are held in a fixed spaced apart relationship by means of a transom member 24 secured thereto by a plurality of bolts 23. One extremity of each side frame is provided with an opening that is adapted to receive a bushing 20, 21, to which the opposite ends of a transverse axle 22 are adapted to be rotatably secured. A high speed air-cooled motor 25 is supported upon the transom member 24 and has a plurality of clutch, throttle and control handles 27 extending therefrom outwardly through an opening 28 in one of the side frames 19. The output shaft 30 of the motor has a pinion 31 fixed thereto and in meshing engagement with a spur gear 33 fixedly carried on the axle 22 by means of a collar 34. Secured to each end of the axle 22 is a sprocket wheel 35 having a plurality of teeth 36 in meshing engagement with a continuous sprocket chain 37, 38, secured to the inside surface of an endless reinforced rubberized belt 39, the outside surface of which is covered with a plurality of closely spaced cleats 40.

The opposite extremity of each of the side frames 18, 19, is provided with a journal plate 44, 45, that is slidably received in the channels 48, 49 carried by the respective side frames, as more clearly shown in Figures 3 and 4. Each of the journal plates is provided with a bore 52, 53, that is adapted to receive one extremity of a transverse axle 55. A sprocket wheel 56, 57, is rotatably carried at each end of the axle 55, each of which has a plurality of teeth in meshing engagement with the respective teeth of the endless sprocket chains 37, 38. These sprockets are merely idlers and do not drive the sprocket chains, as do the sprocket wheels 35 mounted on the axle 22 at the opposite extremity thereof. The journal plates are slidable longitudinally of the side frames and are maintained in any desired adjusted position relative thereto by means of a pair of adjustment bolts 64, 65. Each bolt 64, 65, is adapted to slidably extend through an opening in a boss 62, 63, carried by each side frame, into threaded engagement with an aligned boss 60, 61, that is carried by the respective journal plates. A flanged abutment 66, 67, fixed to each bolt is in bearing engagement with the intermediate surface of each side frame carried boss 62, 63, so that upon rotation of the bolts in a clockwise direction, the journal plates 44, 45, are adapted to be urged in a direction away from the axle 22. This adjustment is provided so as to provide a takeup arrangement which will compensate for the wear of the respective sprocket chains and sprocket wheels so that the tension in the endless belt 39 may be adjusted. As the parts wear or in the event a tighter belt is desired, the bolts 64, 65, may be rotated so as to increase the distance between the respective axles 22, 55.

In operation, the tractor may be secured in front of or behind any vehicle or device that is desired to be propelled through the snow, whereupon the control handles 27 may be operated to start and propel the tractor device, whereby the pinion 31 is operative to drive the spur gear 33 and the axle 22 to which it is secured. Rotation of the axle 22 is operative to drive the sprocket wheels 35 carried at each extremity thereof and which are in meshing engagement with the endless sprocket chain carried by the belt 39. The rotation of the belt 39 effects rotation of the cleat members 40 which are in engagement with a large surface area, whereupon the tractor is propelled. Since the control handles 27 are within easy reach of anyone on the sled, the operation and control of the tractor may be conveniently effected.

While this invention has been described with particular reference to the specific forms shown in the drawing, it is to be understood that such is not to be construed as imparting limitations upon the invention, which is best defined by the claims appended hereto.

Having thus described my invention, I claim as new and desire to secure by Letters Patent:

1. A snow tractor comprising, in combination, a pair of spaced parallel side frames, a transom rigidly secured to said side frames maintaining them in said spaced relationship, a pair of transverse axle assemblies rotatably carried in longitudinally spaced relationship by said side frames, a pair of spaced sprocket wheels carried by each of said axle, one of said pair of sprocket wheels being fixed on one of said axles, all of said sprocket wheels being of substantially equal diameter, a continuous flexible belt encompassing said frames and said axles, a pair of spaced endless sprocket chains secured to the inside surface of said belt in meshing engagement with said sprocket wheels, a plurality of spaced transversely extending cleats secured in side by side close contact relationship with each other to the outside surface of said belt to define spaced parallel upper and lower undulated surfaces of substantially equal areas, motor means carried by said transom in driving engagement with said one of said axles carrying said fixed sprocket wheels, means for adjusting the longitudinal spacing between said one axle and the other of said axles, a corresponding journal plate adjacent to and rotatably supporting each extremity of said other axle, vertically spaced members carried by and disposed outside of each of said side frames and slidably receiving a corresponding one of said journal plates, said motor means being carried between said side frames, a centrally disposed opening in one of said side frames and motor control means extending through said opening and outwardly of said side frame.

2. A snow tractor as set forth in claim 1, wherein said cleats define a continuously undulated belt of substantially greater width than the distance between said side frames, said slidable journal plates being completely disposed within the lateral extremities of said belt, and said belt substantially completely enclosing said control means.

References Cited in the file of this patent

UNITED STATES PATENTS

| | | |
|---|---|---|
| 758,757 | Jones | May 3, 1904 |
| 1,287,261 | Domer | Dec. 10, 1918 |
| 1,317,103 | Rimailho | Sept. 23, 1919 |
| 1,530,223 | Young | Mar. 17, 1925 |
| 1,894,619 | Knickerbocker | July 17, 1933 |
| 1,987,265 | Miller | Jan. 8, 1935 |
| 2,440,518 | Lewis et al. | Apr. 27, 1948 |
| 2,476,460 | Smith | July 19, 1949 |
| 2,528,890 | Lawrence | Nov. 7, 1950 |
| 2,690,230 | Budesky | Sept. 28, 1954 |
| 2,702,088 | Klimek | Feb. 15, 1955 |